US008179951B2

(12) United States Patent
Okado

(10) Patent No.: US 8,179,951 B2
(45) Date of Patent: May 15, 2012

(54) TRANSMISSION OUTPUT CONTROL APPARATUS, MULTICARRIER TRANSMISSION SYSTEM, TRANSMISSION OUTPUT CONTROL METHOD AND TRANSMISSION OUTPUT CONTROL PROGRAM IN COMPUTER-READABLE STORAGE MEDIUM

(75) Inventor: Hiroshi Okado, Tokyo (JP)

(73) Assignee: NEC Corporation, Tokyo (JP)

( * ) Notice: Subject to any disclaimer, the term of this patent is extended or adjusted under 35 U.S.C. 154(b) by 864 days.

(21) Appl. No.: 11/826,187

(22) Filed: Jul. 12, 2007

(65) Prior Publication Data

US 2008/0025382 A1 Jan. 31, 2008

(30) Foreign Application Priority Data

Jul. 13, 2006 (JP) ................................ 2006-193313

(51) Int. Cl.
*H04L 5/16* (2006.01)

(52) U.S. Cl. ........ 375/222; 375/220; 375/254; 375/295; 375/287; 375/317; 370/252; 379/417

(58) Field of Classification Search .......... 375/219–222, 375/243, 249, 254, 260, 295, 299, 316, 342, 375/344, 348, 350, 223, 257, 287, 288, 317, 375/346
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 7,483,704 | B2 * | 1/2009 | Shimada et al. | 455/453 |
| 8,009,574 | B2 * | 8/2011 | Schenk | 370/252 |
| 2003/0099350 | A1 * | 5/2003 | Bostoen et al. | 379/417 |
| 2004/0032643 | A1 * | 2/2004 | Chimfwembe et al. | 359/337 |
| 2004/0258223 | A1 * | 12/2004 | Rahamim | 379/93.28 |
| 2007/0259680 | A1 * | 11/2007 | Stolle et al. | 455/522 |
| 2008/0212768 | A1 * | 9/2008 | Zhou | 379/417 |

FOREIGN PATENT DOCUMENTS

| | | | |
|---|---|---|---|
| EP | 1 054 516 A2 | | 11/2000 |
| JP | 03-229532 | | 10/1991 |
| JP | 03-278742 | | 12/1991 |
| JP | 2000-101486 | | 4/2000 |
| JP | 2003-333210 | | 11/2003 |
| JP | 2005-520450 | | 7/2005 |
| JP | 2006-033379 | * | 2/2006 |
| JP | 2006-507783 | | 3/2006 |
| JP | 2006-115326 | | 4/2006 |
| WO | WO 02/065657 A1 | | 8/2002 |

OTHER PUBLICATIONS

Japanese Office Action dated Jun. 14, 2011 (with English translation).
Korean Office Action dated May 28, 2009 with English-language translation of Japanese translation.

* cited by examiner

*Primary Examiner* — Hirdepal Singh
(74) *Attorney, Agent, or Firm* — McGinn IP Law Group, PLLC

(57) ABSTRACT

It is an object of the present invention to provide a multicarrier transmission system for enabling degradation of a transmission speed in an adjacent line adjacent to a communication line, to be avoided. For this purpose, a multicarrier transmission system in the present invention is a multicarrier transmission system configured so that a first communication device and a second communication device are connected via a communication line, wherein the first communication device controls a transmission output of a signal to be outputted to the above described communication line, based on a difference between a transmission distance of the above described communication line and a transmission distance of an adjacent line adjacent to the above described communication line.

31 Claims, 11 Drawing Sheets

F I G. 1
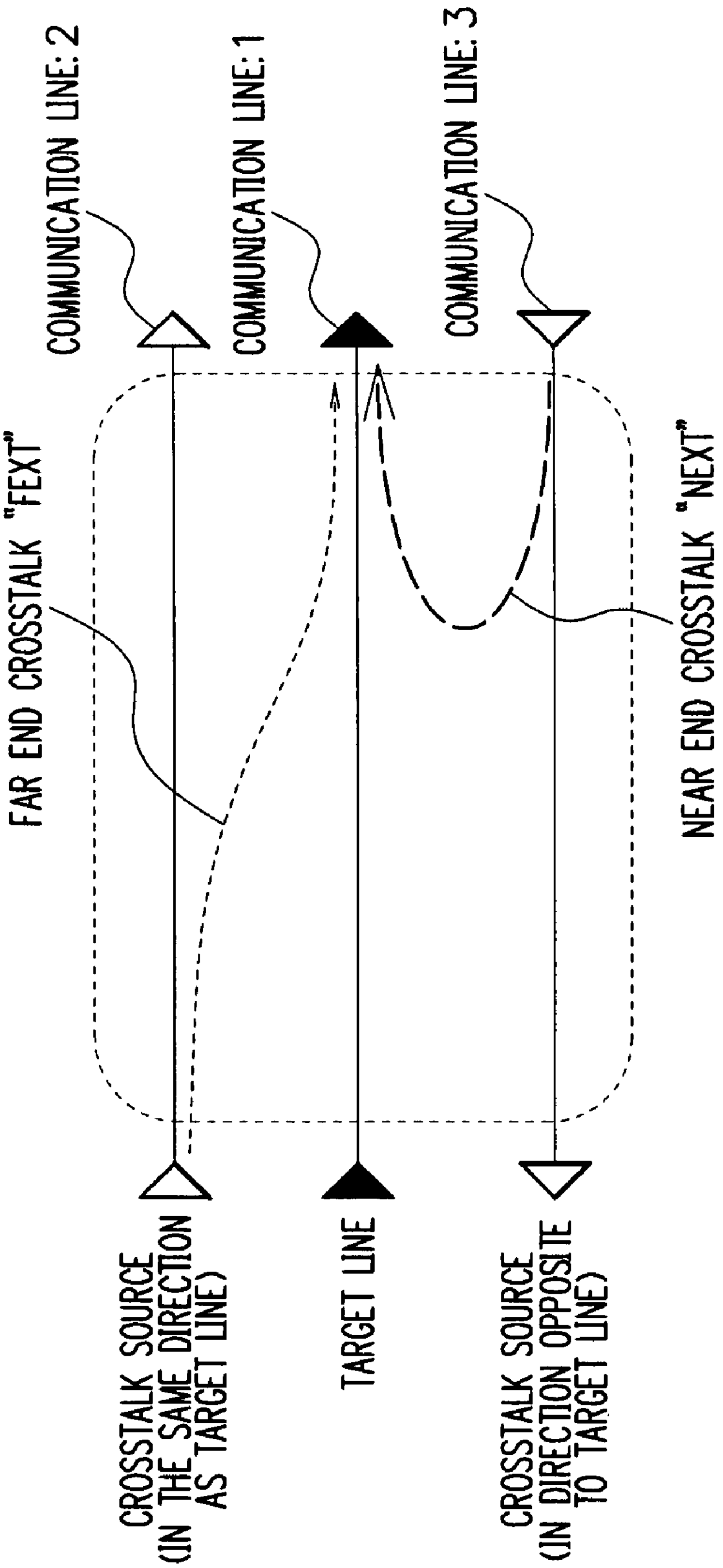

F I G. 8
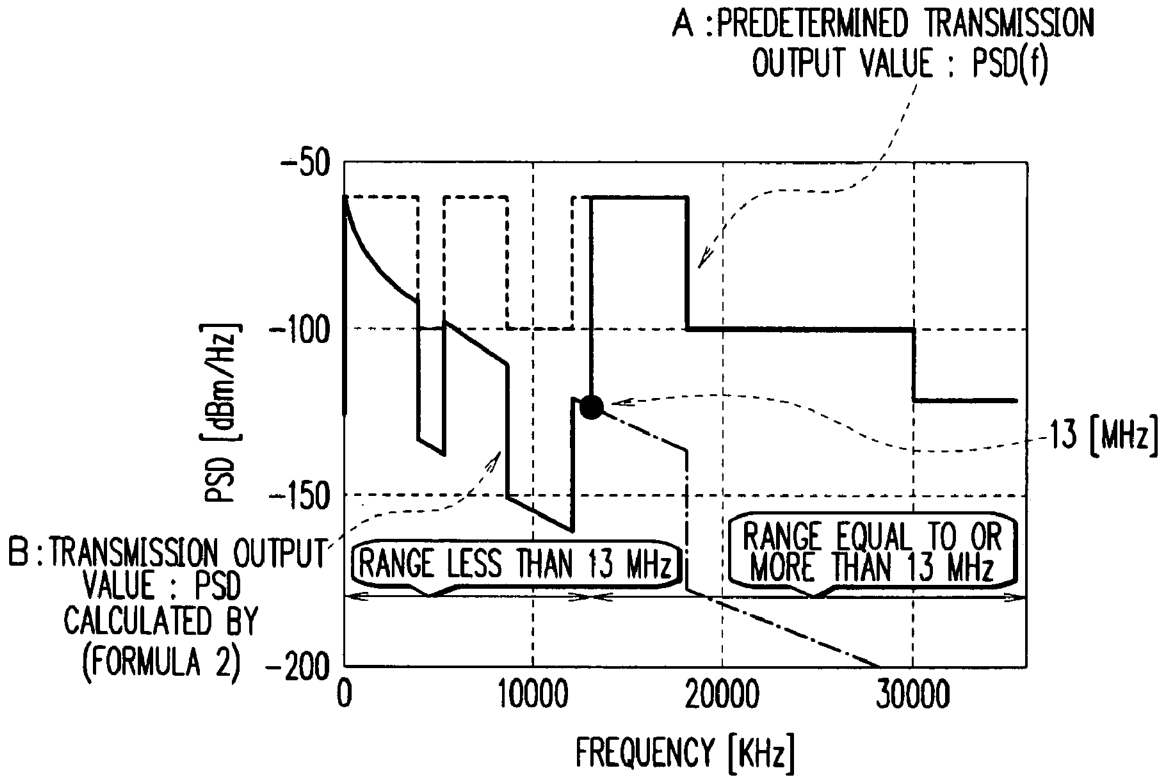

F I G. 12
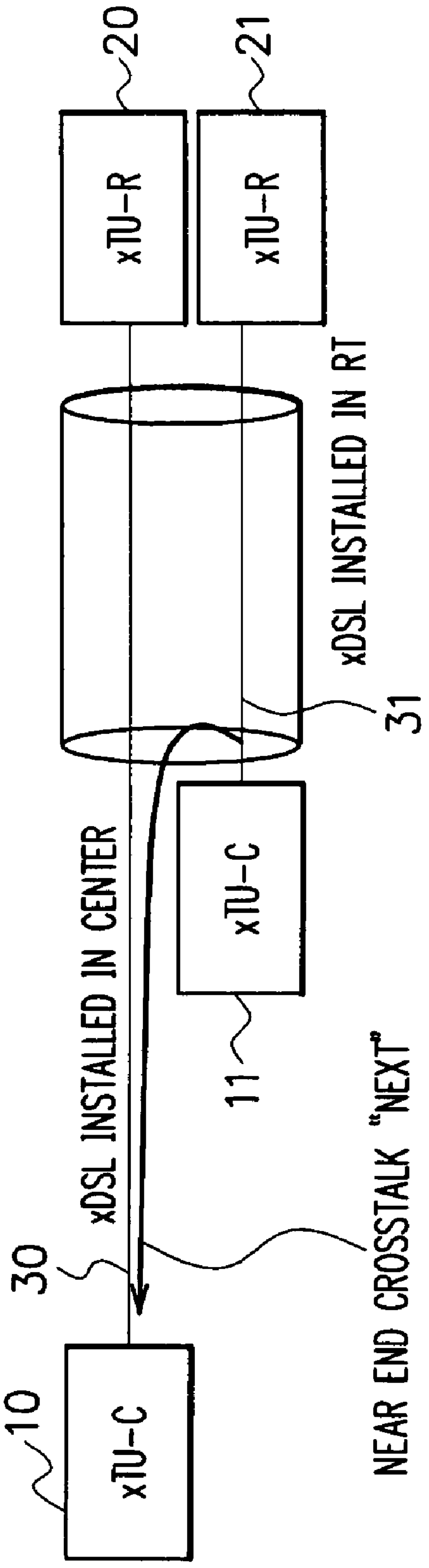

TRANSMISSION OUTPUT CONTROL APPARATUS, MULTICARRIER TRANSMISSION SYSTEM, TRANSMISSION OUTPUT CONTROL METHOD AND TRANSMISSION OUTPUT CONTROL PROGRAM IN COMPUTER-READABLE STORAGE MEDIUM

This application is based upon and claims the benefit of priority from Japanese patent application No. 2006-193313, filed on Jul. 13, 2006, the disclosure of which is incorporated herein in its entirety by reference.

BACKGROUND OF THE INVENTION

The present invention pertains to a transmission output control apparatus, a multicarrier transmission system, a transmission output control method and a transmission output control program in a computer-readable storage medium that are applied to an xDSL (x Digital Subscriber Line) (x is a collective designation of A, H, S, V and the like) that performs a data transmission at a high speed of several Mbits/seconds via a metallic cable such as a telephone line.

DESCRIPTION OF RELATED ART

An xDSL uses a metallic cable such as a telephone line to enable a data transmission at a high speed of several Mbits/seconds.

It should be noted that, as the xDSL, there are ADSL (Asymmetric Digital Subscriber Line), SDSL (Symmetric Digital Subscriber Line), HDSL (High bit-rate Digital Subscriber Line), VDSL (Very high bit-rate Digital Subscriber Line) and the like, which are divided according to differences in transmission speeds, symmetric/asymmetric of the speeds and the like. It should be noted that these are collectively referred to as "xDSL".

The xDSL is referred to as a best effort type service, and its transmission speed varies depending on environmental conditions such as a transmission distance of a communication line and noises.

Typically, in the environmental conditions of a short transmission distance of the communication line and a few noises, the transmission speed becomes fast. Moreover, in the environmental conditions of a long transmission distance of the communication line and a lot of noises, the transmission speed becomes slow.

Moreover, the xDSL employs a DMT (Discrete Multi Tone) method as a modulation method.

In the DMT method, before a modem starts communication, initialization training is performed to measure the transmission distance of the communication line or an SNR (Signal to Noise Ratio) of each carrier. Then, based on the measured SNR of each carrier, a bit rate to be arranged to each carrier is calculated, and based on the above described calculated bit rate, a final transmission speed is determined.

For example, the SNR of a carrier number i (i is an arbitrary integer number) is SNRi, and a summation of the bit rates to be arranged to the respective carriers having the carrier numbers i from m-th to n-th Totalrate is calculated by formula (1). Then, based on the calculated summation of the bit rates (Totalrate), the final transmission speed is determined.

[Formula 1]

$$Totalrate = S \times \sum_{i=m}^{n} \log_2\left(1 + \frac{SNR_i}{\Gamma}\right) \tag{1}$$

Here, S denotes a symbol rate, and S=4 kHz in the case of the ADSL compliant with G.992.1. Moreover, Γ is an effective SNR gap, and Γ=9.75 dB if an error rate is 10-7.

Moreover, a most dominant noise in the xDSL is crosstalk from another line. The crosstalk includes near end crosstalk "NEXT" (a crosstalk source and a source subjected to the crosstalk are in the opposite direction) and far end crosstalk "FEXT" (the crosstalk source and the source subjected to the crosstalk are in the same direction), as shown in FIG. 1. Typically, the far end crosstalk "FEXT" has a less effect of the crosstalk than the near end crosstalk "NEXT".

Hereinafter, with reference to FIG. 1, the near end crosstalk "NEXT" and the far end crosstalk "FEXT" will be described in detail.

If it is assumed that a communication line (1) shown in FIG. 1 is a measurement target, the crosstalk having a communication line (2) through which a signal flows in the same direction as the communication line (1) focused as the measurement target, as "crosstalk source", is the far end crosstalk "FEXT".

Since a signal to be originally transmitted is attenuated along with the transmission distance, a crosstalk amount of this far end crosstalk "FEXT" is also relatively attenuated depending on the transmission distance.

Moreover, the crosstalk having a communication line (3) through which the signal flows in the direction opposite to the communication line (1) focused as the measurement target, as "crosstalk source", is the near end crosstalk "NEXT".

The signal to be originally transmitted is attenuated along with the transmission distance, whereas a crosstalk amount of the near end crosstalk "NEXT" increases in a transmission destination of the signal to be originally transmitted.

Consequently, the near end crosstalk "NEXT" has a more significant effect of the crosstalk than the far end crosstalk "FEXT".

It should be noted that, in a typical xDSL, as shown in FIG. 2, xTU-Cs (XDSL Termination Unit-Center side) (10, 11) installed in a center, which are installed at the center side, are configured to exist in the same position.

Currently, not the configuration as shown in FIG. 2, but the xDSL installed in a remote terminal (RT) as shown in FIG. 3 has been considered.

In the case of the xDSL installed in the remote terminal (RT), as shown in FIG. 3, the positions of the xTU-Cs (10, 11) installed at the center side become different.

Consequently, the far end crosstalk "FEXT" of the xTU-C (11) of the xDSL installed in the RT occurs from the middle of a communication line (30) of the existing xTU-C (10) of the xDSL.

As a result, the far end crosstalk "FEXT" occurring from the xTU-C (11) of the xDSL installed in the RT significantly affects an xTU-R (XDSL Termination Unit-Remote side) (20) of the existing xDSLs (10, 20), which are adjacent to the xDSLs (11, 21) installed in the RT.

This is because, when the signal transmitted from the xTU-C (10) of the xDSL has been attenuated depending on the transmission distance of the communication line (30), if the signal of high transmission output level has been transmitted from the xTU-C (11) of the xDSL installed in the RT, this signal gives an interference to the xTU-R (20) of the existing xDSL on the center side, as very large far end crosstalk "FEXT".

Consequently, in the case of the configuration shown in FIG. 3, it seems to be necessary to reduce the effect of the far end crosstalk "FEXT" from the xTU-C (11) of the xDSL installed in the RT and avoid degradation of the transmission speed of the adjacent xDSL installed in the center.

It should be noted that, as a method of reducing the effect of the far end crosstalk "FEXT" of the xDSL installed in the RT as described above, a method of reducing the transmission output level of the signal to be transmitted from the xTU-C (11) of the xDSL installed in the RT is conceivable.

For example, the ITU-T Recommendation G.993.1, which is a recommendation on the VDSL, defines a function of reducing the transmission output equal to or less than 1.1 MHz of the VDSL installed in the center, for reducing the interference with adjacent ADSL installed in the center.

Moreover, the ITU-T Recommendation G.993.2 describes a method of controlling the transmission output level of the signal to be transmitted from the xTU-C (11) of the VDSL installed in the RT so that it becomes equal to the effect of the far end crosstalk "FEXT" of the signal transmitted from the xTU-C (10) of the ADSL.

Specifically, the transmission output level of the signal to be transmitted from the xTU-C (11) of the VDSL installed in the RT is controlled so that the transmission output level of the signal to be transmitted from the xTU-C (10) of the adjacent ADSL installed in the center becomes equal to the transmission output level at a state of being attenuated by the communication line (30).

Thereby, it can be set to the same state as the xDSLs, existing in the same position.

However, the case of the above described method requires that the transmission output level of the signal to be transmitted from the xTU-C (10) of the ADSL is known, and information on an attenuation amount of the above described transmission output level until a point where the far end crosstalk "FEXT" of the xTU-C (11) of the VDSL installed in the RT is mixed in, "that is, the attenuation amount of the transmission output level in which the transmission output level of the signal to be transmitted from the xTU-C (10) of the ADSL installed in the center is attenuated by the transmission distance of the communication line (30) to the xTU-C (11) of the VDSL installed in the RT".

It should be noted that the above described method is also effective for handling a crosstalk noise in the case where both of the xDSL installed in the center and the xDSL installed in the RT as shown in FIG. 3 are the VDSLs, however, in the case where both are the VDSLs, a range of a frequency band for attenuating the transmission output level is up to 30 MHz, which is a band of the VDSL.

However, if the transmission distance of the communication line (30) of the VDSL installed in the center is long, since a high-frequency band cannot be used, the attenuation of the transmission output level is not required with respect to the high-frequency band.

It should be noted that, as a technical document that has been filed prior to the present invention, there is a document disclosing a technique for precisely determining performance of the DSL by using measurement of the crosstalk, an electromagnetic noise, a background noise and a loop configuration (for example, Japanese Patent Application Laid-Open Publication of PCT No. 2006-507783 (Patent Document 1)).

In addition, there is a document disclosing a technique capable of suppressing the interference due to the crosstalk, with respect to another communication method providing a service by using an adjacent telephone line (for example, Japanese Patent Laid-Open No. 2006-115326 (Patent Document 2)).

However, the above described Patent Documents 1 and 2 suggest neither description nor necessity of controlling the transmission output of the signal to be outputted to the communication line, based on a difference between the transmission distance of the communication line used by the xDSL and the transmission distance of the adjacent line adjacent to the communication line, and avoiding degradation of the transmission speed in the adjacent line.

SUMMARY OF THE INVENTION

An exemplary object of the invention is, to provide a transmission output control apparatus, a multicarrier transmission system, a transmission output control method and a transmission output control program in a computer-readable storage medium for enabling degradation of a transmission speed in an adjacent line, which is the above described problem, to be avoided.

A transmission output control apparatus according to an exemplary aspect of the present invention controls a transmission output of a signal to be outputted to a communication line, including:

a transmission output control unit that controls the transmission output of the signal to be outputted to the above described communication line, based on a difference between a transmission distance of the above described communication line and a transmission distance of an adjacent line adjacent to the above described communication line.

Moreover, a multicarrier transmission system according to an exemplary aspect of the present invention is configured so that a first communication device and a second communication device are connected via a communication line, wherein:

the above described first communication device includes a transmission output control unit that controls a transmission output of a signal to be outputted to the above described communication line, based on a difference between a transmission distance of the above described communication line and a transmission distance of an adjacent line adjacent to the above described communication line.

A multicarrier transmission system according to an exemplary aspect of the present invention is configured so that a first communication device and a second communication device are connected via a communication line, wherein:

the above described first communication device has transmission output control means for controlling a transmission output of a signal to be outputted to the above described communication line, based on a difference between a transmission distance of the above described communication line and a transmission distance of an adjacent line adjacent to the above described communication line.

A transmission output control method according to an exemplary aspect of the present invention is for a transmission output control apparatus for controlling a transmission output of a signal to be outputted to a communication line, comprising:

a transmission output control step for controlling the transmission output of the signal to be outputted to the above described communication line, based on a difference between a transmission distance of the above described communication line and a transmission distance of an adjacent line adjacent to the above described communication line.

A transmission output control method according to an exemplary aspect of the present invention is for a multicarrier transmission system configured so that a first communication device and a second communication device are connected via a communication line, comprising:

a transmission output control step for controlling a transmission output of a signal to be outputted to the above described communication line, based on a difference between a transmission distance of the above described communication line and a transmission distance of an adjacent line adjacent to the above described communication line.

A transmission output control program stored in a computer-readable medium according to an exemplary aspect of the present invention controls a transmission output of a signal to be outputted to a communication line, the program causing a computer to perform:

a transmission output control process for controlling the transmission output of the signal to be outputted to the above described communication line, based on a difference between a transmission distance of the above described communication line and a transmission distance of an adjacent line adjacent to the above described communication line, is executed by the above described transmission output control apparatus.

BRIEF DESCRIPTION OF THE DRAWINGS

The objects and features of the present invention will become more apparent from the consideration of the following detailed description taken in conjunction with the accompanying drawings, in which:

FIG. 1 is a diagram for illustrating near end crosstalk "NEXT" and far end crosstalk "FEXT";

FIG. 8 is a diagram showing the value of the transmission output value employed by the xTU-C (100) for transmitting the signal to the communication line (300), and showing the case where the xTU-C (100) employs the transmission output value: PSD "B shown in FIG. 7" calculated by Formula (2) in a range less than 13 MHz, employs the predetermined transmission output value: PSD(f) "A shown in FIG. 7" in a range equal to or more than 13 MHz, and transmits the signal to the communication line (300);

FIG. 12 is a diagram showing a system configuration of the multicarrier transmission system installed in the remote terminal (RT), which is configured so that the xTU-Cs (XDSL Termination Unit-Center side) (10, 11) installed at the center side exist in the different positions, and illustrating the near end crosstalk "NEXT" of the xTU-C (11) of the xDSL installed in the RT.

DESCRIPTION OF EXEMPLARY EMBODIMENTS

First, a brief overview of a multicarrier transmission system in this example will be described.

Figure 2:
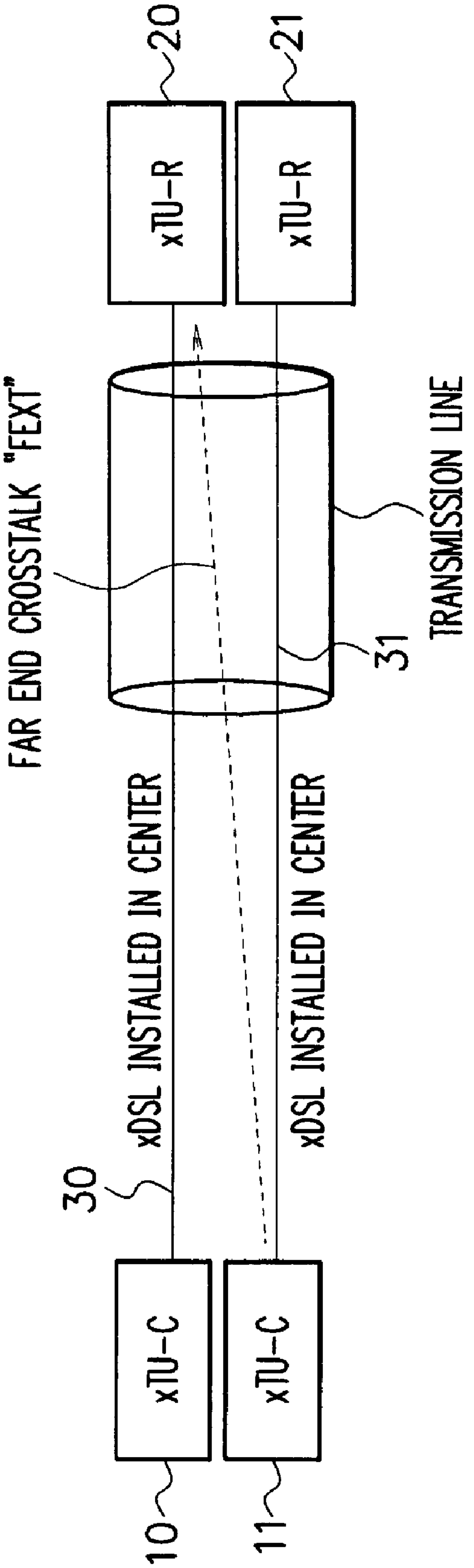
FIG. 2 is a diagram showing a system configuration of a multicarrier transmission system configured so that xTU-Cs (XDSL Termination Unit-Center side) (10, 11) installed at a center side exist in the same position.
Figure 3:
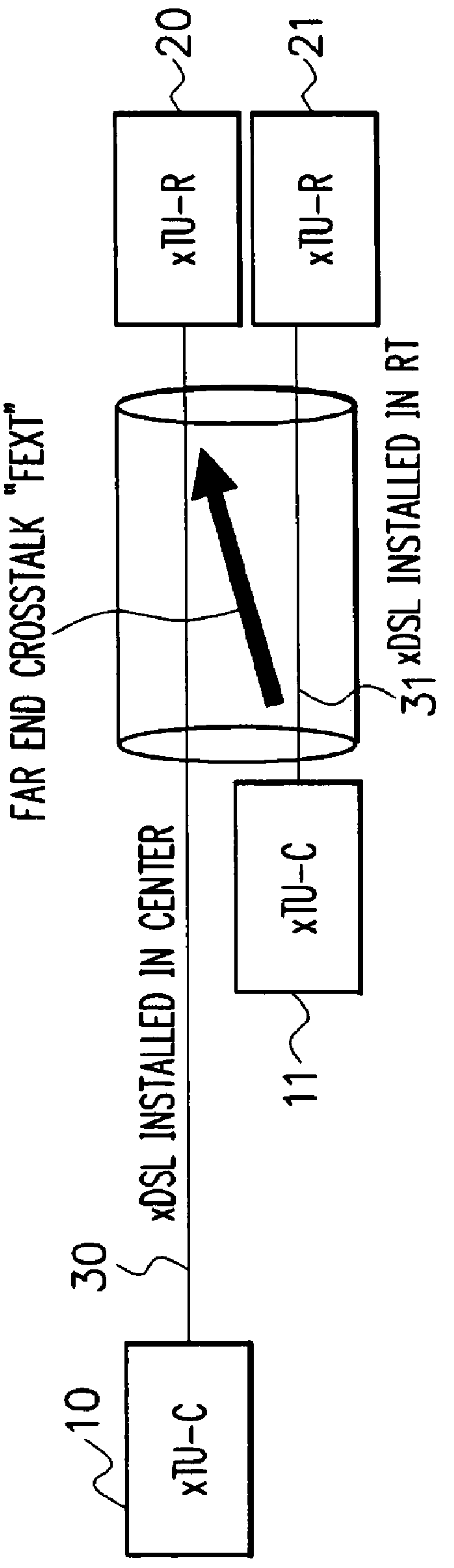
FIG. 3 is a diagram showing a system configuration of a multicarrier transmission system installed in a remote terminal (RT), which is configured so that the xTU-Cs (XDSL Termination Unit-Center side) (10, 11) installed at the center side exist in different positions, and illustrating the far end crosstalk "FEXT" of the xTU-C (11) of an xDSL installed in the RT.
Figure 4:
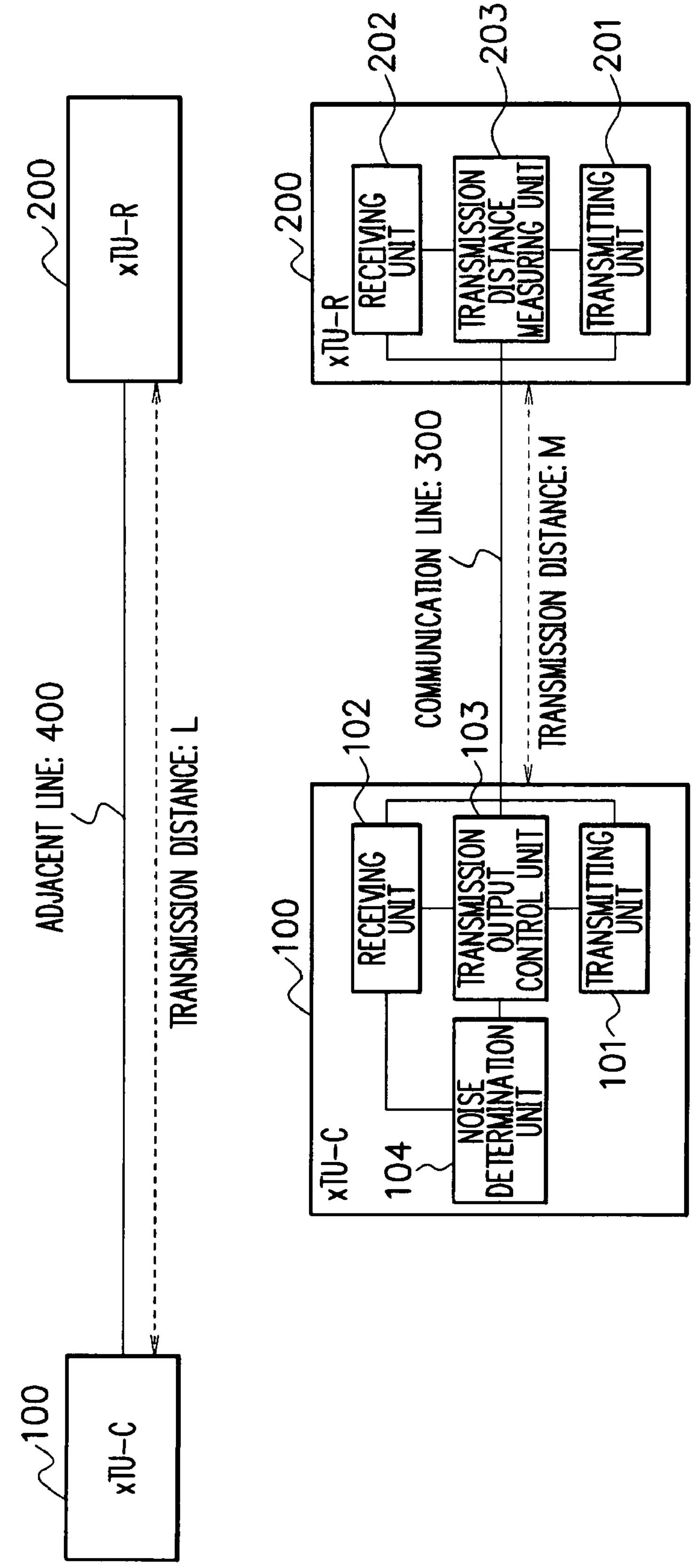
FIG. 4 is a diagram showing a system configuration of a multicarrier transmission system in this example.

As shown in FIG. 4, the multicarrier transmission system in this example is a multicarrier transmission system configured so that a first communication device (corresponding to an xTU-C: 100) and a second communication device (corresponding to an xTU-R: 200) are connected via a communication line (300).

The first communication device (100) controls a transmission output of a signal to be outputted to the communication line (300), based on a difference between a transmission distance of the communication line (300) and a transmission distance of an adjacent line (400) adjacent to the communication line (300).

In this way, since the first communication device (100) in this example controls the transmission output of the signal to be outputted to the communication line (300), based on the difference between the transmission distance of the communication line (300) and the transmission distance of the adjacent line (400) adjacent to the communication line (300), the first communication device (100) can control the transmission output of the signal to be outputted to the communication line (300) so that it may not affect a transmission speed of another xDSL which is using the adjacent line (400).

Therefore, the first communication device (100) can reduce an effect of crosstalk of an xDSL installed in an RT, and avoid degradation of a transmission speed of an adjacent xDSL installed in a center.

Hereinafter, with reference to the accompanying drawings, the multicarrier transmission system in this example will be described in detail.

<System Configuration of Multicarrier Transmission System>

First, with reference to FIG. 4, a system configuration of the multicarrier transmission system in this example will be described.

The multicarrier transmission system in this example is configured so that the xTU-C (XDSL Termination Unit-Center side) (100), which is a center side device, and the xTU-R (XDSL Termination Unit-Remote side) (200), which is a customer premise side device, are connected via the communication line (300).

<Internal Configuration of xTU-C: 100>

Next, with reference to FIG. 4, an internal configuration of the xTU-C (100), which is the center side device, will be described.

The xTU-C (100) in this example is configured to have a transmitting unit (101), a receiving unit (102), a transmission output control unit (103) and a noise determination unit (104).

The transmitting unit (101) transmits a signal to the xTU-R (200).

The receiving unit (102) receives a signal transmitted from the xTU-R (200).

The transmission output control unit (103) controls the transmission output of the signal to be transmitted from the xTU-C (100) to the communication line (300).

The noise determination unit (104) measures a crosstalk noise from the adjacent line (400) adjacent to the communication line (300). Then the noise determination unit (104) estimates a used frequency band which is used by another xDSL on the adjacent line (400), based on the measured crosstalk noise from the adjacent line (400).

<Internal Configuration of xTU-R: 200>

Next, with reference to FIG. 4, an internal configuration of the xTU-R (200), which is the customer premise side device, will be described.

The xTU-R (200) in this example is configured to have a transmitting unit (201), a receiving unit (202) and a transmission distance measuring unit (203).

The transmitting unit (201) transmits the signal to the xTU-C (100).

The receiving unit (202) receives the signal transmitted from the xTU-C (100).

The transmission distance measuring unit (203) measures the transmission distance of the communication line (300).

It should be noted that the transmission distance measuring unit (203) in this example measures the transmission distance of the communication line (300), based on a receiving level of the signal received from the xTU-C (100).

<Processing Operations>

Next, with reference to FIG. 5, a series of processing operations in the multicarrier transmission system shown in FIG. 4 will be described.

First, the transmission distance measuring unit (203) of the xTU-R (200) measures the transmission distance of the communication line (300), based on the receiving level of the signal received from the xTU-C (100) via the communication line (300), and records the above described measured transmission distance of the communication line (300) (step S1).

It should be noted that the transmission distance measuring unit (203) calculates how much a known transmission output level transmitted from the xTU-C (100) has been attenuated by the communication line (300), based on the receiving level received from the xTU-C (100).

Thereby, the transmission distance measuring unit (203) can measure the transmission distance of the communication line (300).

For example, it is assumed that the transmission output level at 160 kHz is x [dBm/Hz] and the receiving level received from the xTU-C (100) via the communication line (300) is y [dBm/Hz].

In this case, the transmission distance measuring unit (203) finds an attenuation amount of the communication line (300) at 160 kHz by calculating a difference: x-y [dBm/Hz] between the transmission output level: x and the receiving level: y, and based on this attenuation amount, the transmission distance measuring unit (203) can measure the transmission distance of the communication line (300).

It should be noted that a method of measuring the transmission distance of the communication line (300) is not limited to the above described measuring method, and any method can be applied to measure the transmission distance of the communication line (300).

Next, the xTU-R (200) transmits the transmission distance of the communication line (300) measured in the transmission distance measuring unit (203), from the transmitting unit (201) to the xTU-C (100) (step S2).

Thereby, the xTU-C (100) can receive the transmission distance of the communication line (300) from the xTU-R (200) and comprehend the transmission distance of the communication line (300).

Next, the xTU-C (100) measures the crosstalk noise from the xDSL on the adjacent line (400) by using a spectrum analyzer and the like (step S3).

It should be noted that a method of measuring the crosstalk noise from the xDSL on the adjacent line (400) is not limited to the above described measuring method, and any method can be applied to measure the crosstalk noise from the xDSL on the adjacent line (400). For example, it is also possible to use a modem to measure it.

Next, the xTU-C (100) determines whether or not a noise equal to or more than a predetermined threshold has occurred on the adjacent line (400), based on the crosstalk noise from the xDSL on the adjacent line (400) measured at step S3 (step S4). It should be noted that setting of the predetermined threshold can be constructed to be arbitrarily changed.

If the xTU-C (100) determines that the noise equal to or more than the predetermined threshold has not occurred on the adjacent line (400) (step S4/No), the xTU-C (100) determines that the transmission output control is not required, and transmits the signal with a default predetermined transmission output value (step S5).

In other words, if the noise has not occurred on the adjacent line (400), the signal transmitted from the xTU-C (100) to the communication line (300) does not affect the signal on the adjacent line (400), which enables the xTU-C (100) to transmit the signal to the communication line (300) with the predetermined transmission output value at initialization.

It should be noted that, as the predetermined transmission output value, a maximum transmission output value disclosed in the ITU-T Recommendation G.993.2, the ITU-T Recommendation G.993.3 and the like can be applied.

Moreover, if the xTU-C (100) determines that the noise equal to or more than the predetermined threshold has occurred on the adjacent line (400) (step S4/Yes), the xTU-C (100) performs the transmission output control with respect to the signal to be transmitted to the communication line (300).

In other words, if the noise has occurred on the adjacent line (400), since the signal transmitted from the xTU-C (100) to the communication line (300) will affect the signal on the adjacent line (400), the xTU-C (100) performs the transmission output control with respect to the signal to be transmitted to the communication line (300).

In this case, the xTU-C (100) estimates the used frequency band which is used by the xDSL on the adjacent line (400), based on the crosstalk noise from the xDSL on the adjacent line (400) measured at step S3 (step S6).

Figure 6:
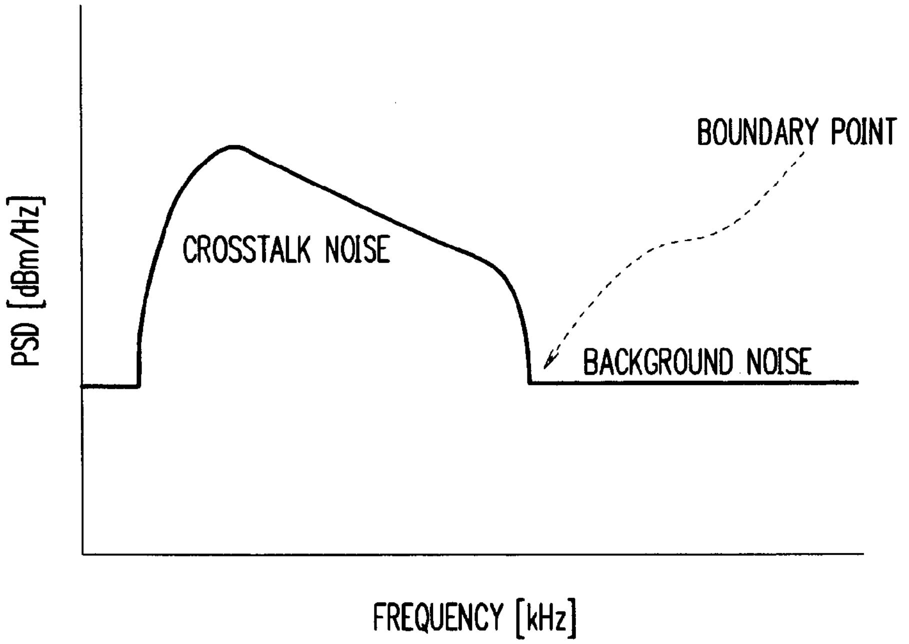
FIG. 6 is a diagram showing an example of a result of measuring a crosstalk noise from an xDSL on an adjacent line (400)

For example, if a measurement result as shown in FIG. 6 has been obtained as a result of measuring the crosstalk noise from the xDSL on the adjacent line (400), the xTU-C (100) can estimate the used frequency band which is used by the xDSL on the adjacent line (400), by identifying a frequency band at "boundary point" between "crosstalk noise" from the adjacent xDSL and "background noise".

It should be noted that "background noise" is a noise including a white noise generated by the xTU-C (100) or the like, and is a basic noise which occurs on the adjacent line (400) in a normal state.

It should be noted that the frequency band in which "crosstalk noise" from the adjacent xDSL has occurred corresponds to the used frequency band which is used by the xDSL on the adjacent line (400).

Next, the xTU-C (100) calculates the transmission output value of the signal to be transmitted from the xTU-C (100) to the communication line (300) within a range of the used frequency band estimated at step S6 (step S7).

For example, when it is assumed that the predetermined transmission output value is PSD(f), the attenuation amount per 1 km of the communication line (300) is |H(f)|, the transmission distance of the communication line (300) which is an interference source is M [km], and the transmission distance of the adjacent line (400) which is a source to be interfered is L [km], the transmission output value: PSD of the signal to be transmitted from the xTU-C (100) to the communication line (300) within the range of the used frequency band is calculated by Formula (2) as follows.

[Formula 2]

$$PSD=PSD(f)-|H(f)|(L-M) \quad (2)$$

It should be noted that the transmission distance of the communication line (300): M and the transmission distance of the adjacent line (400): L corresponds to distances shown in FIG. 4. However, it is assumed that the xTU-C (100) has previously obtained the transmission distance of the adjacent line (400): L.

It should be noted that, as a method of obtaining the transmission distance of the adjacent line (400): L by the xTU-C (100), for example, a method of inputting or setting the transmission distance of the adjacent line (400): L in the xTU-C (100) by a user can be cited.

It should be noted that the method of obtaining the transmission distance of the adjacent line (400): L by the xTU-C (100) is not particularly limited, and any method can be applied to construct the xTU-C (100) to obtain the transmission distance of the adjacent line (400): L.

Figure 7:
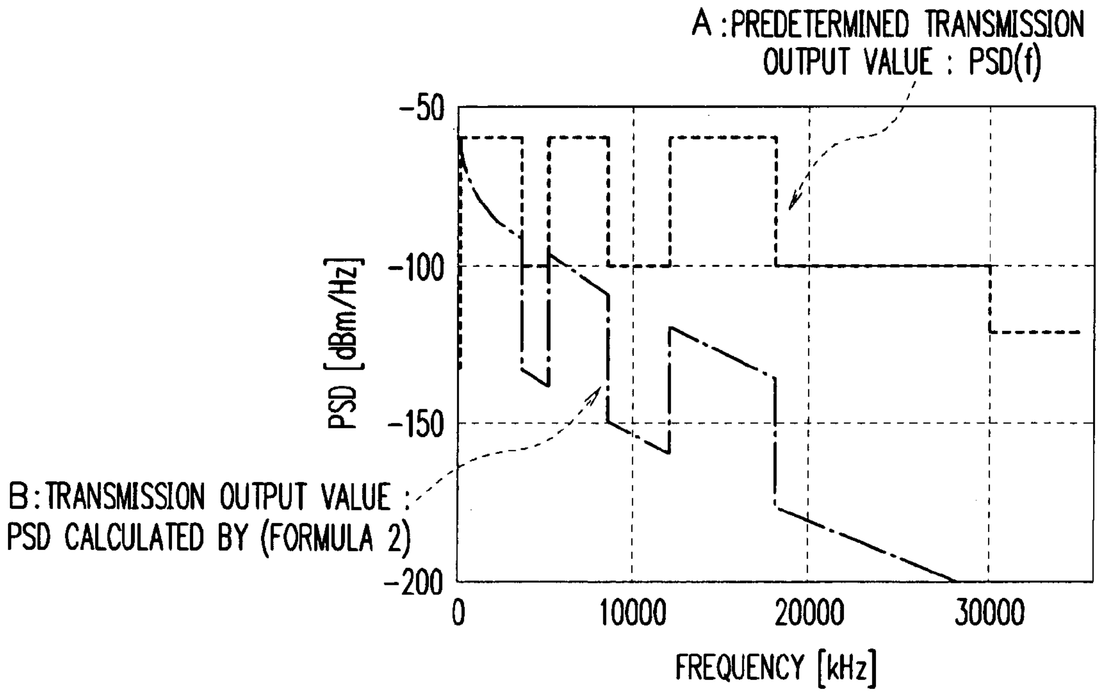
FIG. 7 is a diagram showing a value of a transmission output value employed by an xTU-C (100) for transmitting a signal to a communication line (300), and showing a relationship between a predetermined transmission output value: PSD(f) "A shown in FIG. 7" and a transmission output value: PSD "B shown in FIG. 7" calculated by Formula (2)

A relationship between the predetermined transmission output value: PSD(f) and the transmission output value: PSD calculated by the above described Formula (2) is shown in FIG. 7.

The predetermined transmission output value: PSD(f) corresponds to "A" shown in FIG. 7, and the transmission output value: PSD calculated by the above described Formula (2) corresponds to "B" shown in FIG. 7.

For example, if "crosstalk noise" from the xDSL on the adjacent line (400) is in a range less than 13 MHz, the xTU-C (100) estimates that the used frequency band which is used by the xDSL on the adjacent line (400) is "13 MHz".

Consequently, the xTU-C (100) employs a value shown with a solid line shown in FIG. 8, and in the range less than "13 MHz", the xTU-C (100) employs the transmission output value: PSD "B shown in FIG. 7" calculated by the above described Formula (2), and in a range equal to or more than "13 MHz", the xTU-C (100) employs the predetermined transmission output value: PSD(f) "A shown in FIG. 7".

Next, the xTU-C (100) performs the transmission output control based on the used frequency band of the xDSL on the adjacent line (400), which has been estimated at step S6, and the transmission output value calculated at step S7 (step S8).

In this case, within the range of the used frequency band of the xDSL on the adjacent line (400), the xTU-C (100) transmits the signal to the communication line (300) based on the transmission output value: PSD calculated by the above described Formula (2).

Moreover, out of the range of the used frequency band of the xDSL on the adjacent line (400), the xTU-C (100) transmits the signal to the communication line (300) based on the predetermined transmission output value: PSD(f).

It should be noted that, when this is described based on FIG. 8, in the range less than "13 MHz", the xTU-C (100) employs the transmission output value: PSD "B shown in FIG. 7" calculated by the above described Formula (2), and transmits the signal to the communication line (300) based on the above described employed transmission output value: PSD.

Moreover, in the range equal to or more than "13 MHz", the xTU-C (100) employs the predetermined transmission output value: PSD(f) "A shown in FIG. 7", and transmits the signal to the communication line (300) based on the above described employed predetermined transmission output value: PSD(f).

In this way, the xTU-C (100) in this example calculates the transmission output value which has a less effect on the adjacent line (400), based on the difference between the transmission distance of the communication line (300) used by the xTU-C (100) and the transmission distance of the adjacent line (400) adjacent to the communication line (300), and controls to transmit the signal to the communication line (300) by using the above described calculated transmission output value.

Thereby, the xTU-C (100) can suppress the transmission output value of the signal to be transmitted to the communication line (300) and control so that it may not affect the transmission speed of another xDSL which is using the adjacent line (400).

Consequently, the xTU-C (100) can suppress the crosstalk of the xDSL installed in the RT, and avoid the degradation of the transmission speed of the adjacent xDSL installed in the center.

Moreover, the xTU-C (100) in this example estimates the used frequency band which is used by the xDSL on the adjacent line (400), uses the transmission output value which has a less effect on the adjacent line (400) to control the transmission output of the signal to be outputted to the communication line (300) within the range of the used frequency band which is used by the xDSL on the adjacent line (400), and uses the predetermined transmission output value to control the transmission output of the signal to be outputted to the communication line (300) out of the range of the used frequency band which is used by the xDSL on the adjacent line (400).

Thereby, in a frequency band which is not used by the xDSL of the adjacent line (400), the xTU-C (100) can maximize the transmission speed of the communication line (300) to transmit the signal. Therefore, the xTU-C (100) can avoid the degradation of the transmission speed of the xDSL on the adjacent line (400) while minimizing the degradation of the transmission speed of the xDSL on the communication line (300).

Particularly, if the transmission distance of the communication line (400) of VDSL installed in the center: L is long, since a high-frequency band cannot be used, the attenuation of the transmission output value is not required with respect to the high-frequency band. Consequently, the above described example becomes an effective method for handling the crosstalk noise in the case where both of the xDSL installed in the center and the xDSL installed in the RT are the VDSLs.

Figure 9:
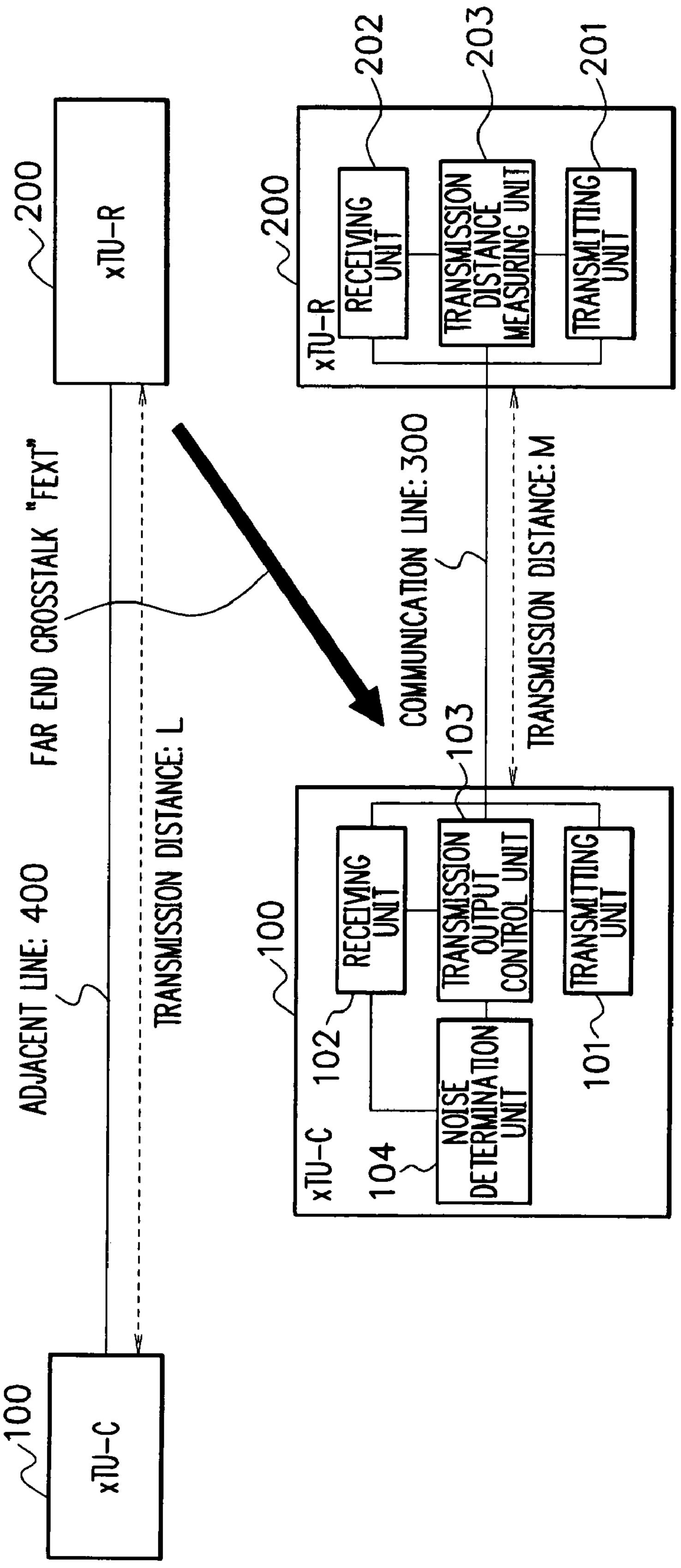
FIG. 9 is a diagram for illustrating a method of determining whether or not there is far end crosstalk "FEXT" of uplink from an adjacent line (400), in the xTU-C (100)

It should be noted that, as a determination method of determining whether or not the xDSL of the adjacent line (400) is the VDSL, as shown in FIG. 9, a method of determining whether or not there is the far end crosstalk "FEXT" of uplink from the adjacent line (400), in the xTU-C (100) can be cited.

Figure 5:
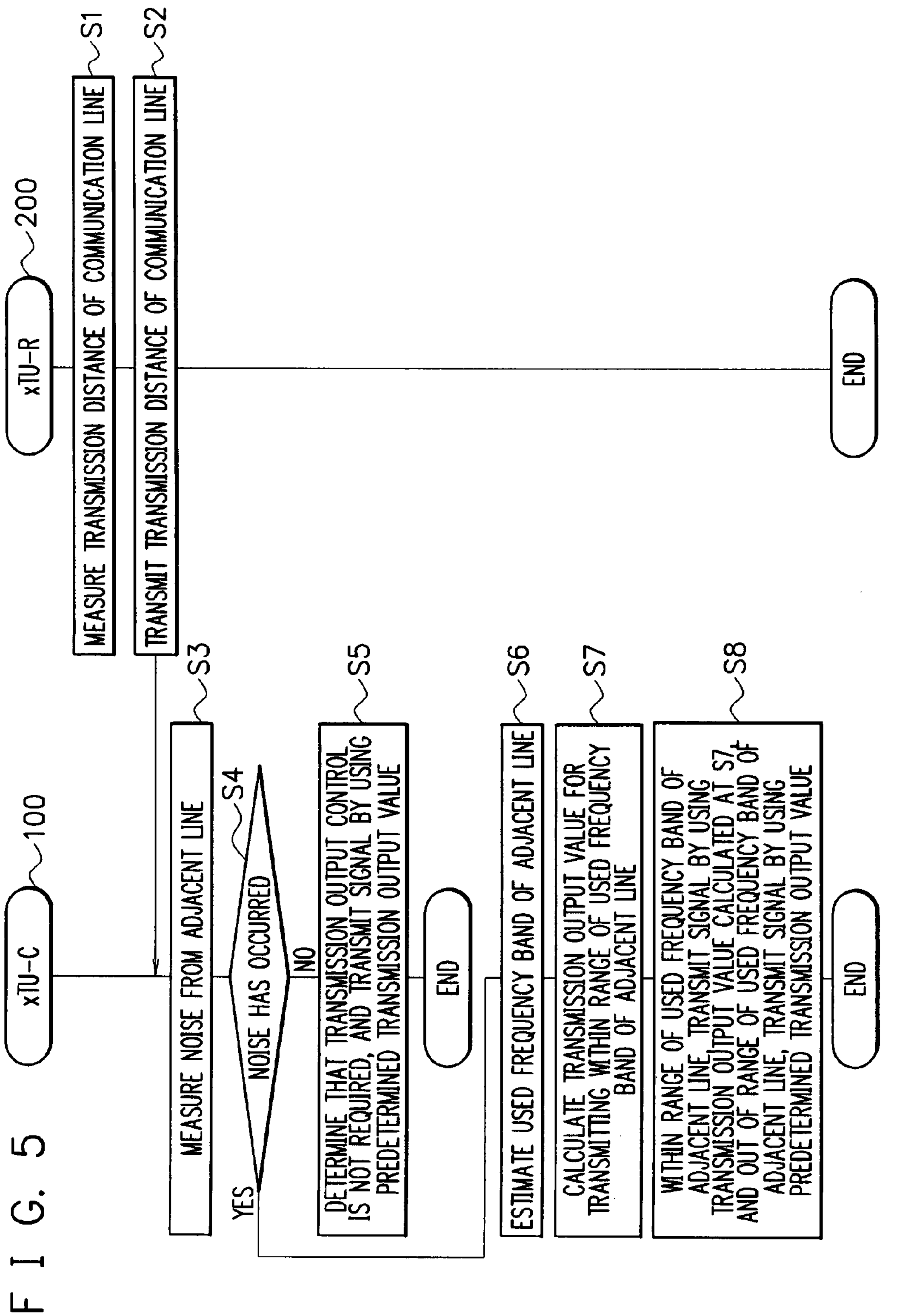
FIG. 5 is a sequence chart showing a series of processing operations in the multicarrier transmission system in this example.

In this case, at step S4 shown in FIG. 5, if the xTU-C (100) determines that the noise of the far end crosstalk of uplink from the adjacent line (400) is equal to or more than the predetermined threshold, the xTU-C (100) determines that the xDSL of the adjacent line (400) is the VDSL. It should be noted that setting of the predetermined threshold can be constructed to be arbitrarily changed.

Moreover, if the xTU-C (100) determines that the noise of the far end crosstalk of uplink from the adjacent line (400) is less than the predetermined threshold, the xTU-C (100) determines that the xDSL of the adjacent line (400) is not the VDSL.

In other words, in the case where the xDSL of the adjacent line (400) is the VDSL, since a lot of noises of the far end crosstalk of uplink from the adjacent line (400) will occur, the xTU-C (100) can determine that the xDSL of the adjacent line (400) is the VDSL, if the noise of the far end crosstalk of uplink from the adjacent line (400) is equal to or more than the predetermined threshold.

Thereby, if the xTU-C (100) determines that the adjacent line (400) is the VDSL, the xTU-C (100) does not perform the attenuation control of the transmission output value with respect to the high-frequency band which is used by the VDSL of the adjacent line (400), and can use the predetermined transmission output value: PSD(f) to control the transmission output of the signal to be outputted to the communication line (300).

SECOND EXAMPLE

Next, a second example will be described.

In the multicarrier transmission system in the first example, as shown in FIG. 5, the transmission distance of the communication line (300) is previously measured at the xTU-R (200) side (step S1), and the above described measured transmission distance of the communication line (300) is transmitted to the xTU-C (100) side (step S2).

Figure 10:
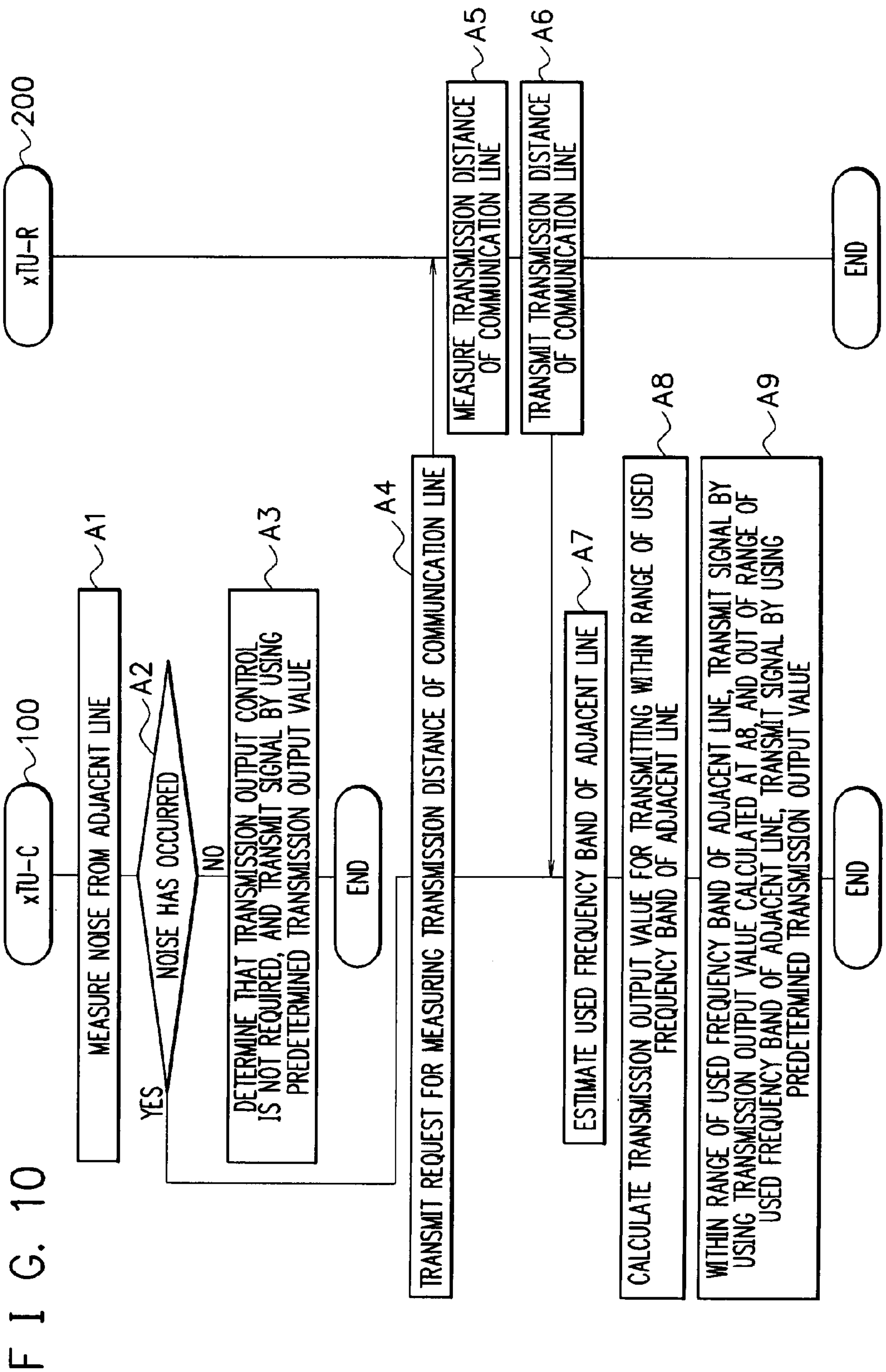
FIG. 10 is a sequence chart showing a series of processing operations in a multicarrier transmission system in a second example.

In a multicarrier transmission system in the second example, as shown in FIG. 10, if the xTU-C (100) determines that the noise equal to or more than the predetermined threshold has occurred on the adjacent line (400) (step A2/Yes), the xTU-C (100) transmits a request for measuring the communication line (300) to the xTU-R (200) side (step A4). Then, the xTU-R (200) is characterized in that if the xTU-R (200) receives the request for measuring the communication line (300) from the xTU-C (100), the xTU-R (200) measures the transmission distance of the communication line (300) (step A5) and transmits the above described measured transmission distance of the communication line (300) to the xTU-C (100) (step A6).

Thereby, if the xTU-C (100) determines that the noise equal to or more than the predetermined threshold has occurred on the adjacent line (400) (step A2/Yes), the xTU-C (100) can obtain the transmission distance of the communication line (300).

It should be noted that an obtaining time at which the xTU-C (100) obtains the transmission distance of the communication line (300) is not limited to the time when the xTU-C (100) has determined that the noise equal to or more than the predetermined threshold has occurred on the adjacent line (400), as shown in FIG. 10 described above, and the system can be constructed so that the xTU-C (100) may obtain the transmission distance of the communication line (300) at any time if the transmission distance of the communication line (300) has been obtained when the transmission output value for transmitting within the range of the used frequency band of the adjacent line (400) is calculated at step A8.

THIRD EXAMPLE

Next, a third example will be described.

In the multicarrier transmission system in the first and second examples, the transmission distance of the communication line (300) is measured at the xTU-R (200) side, the above described measured transmission distance of the communication line (300) is transmitted to the xTU-C (100) side, and the xTU-C (100) obtains the transmission distance of the communication line (300).

Figure 11:
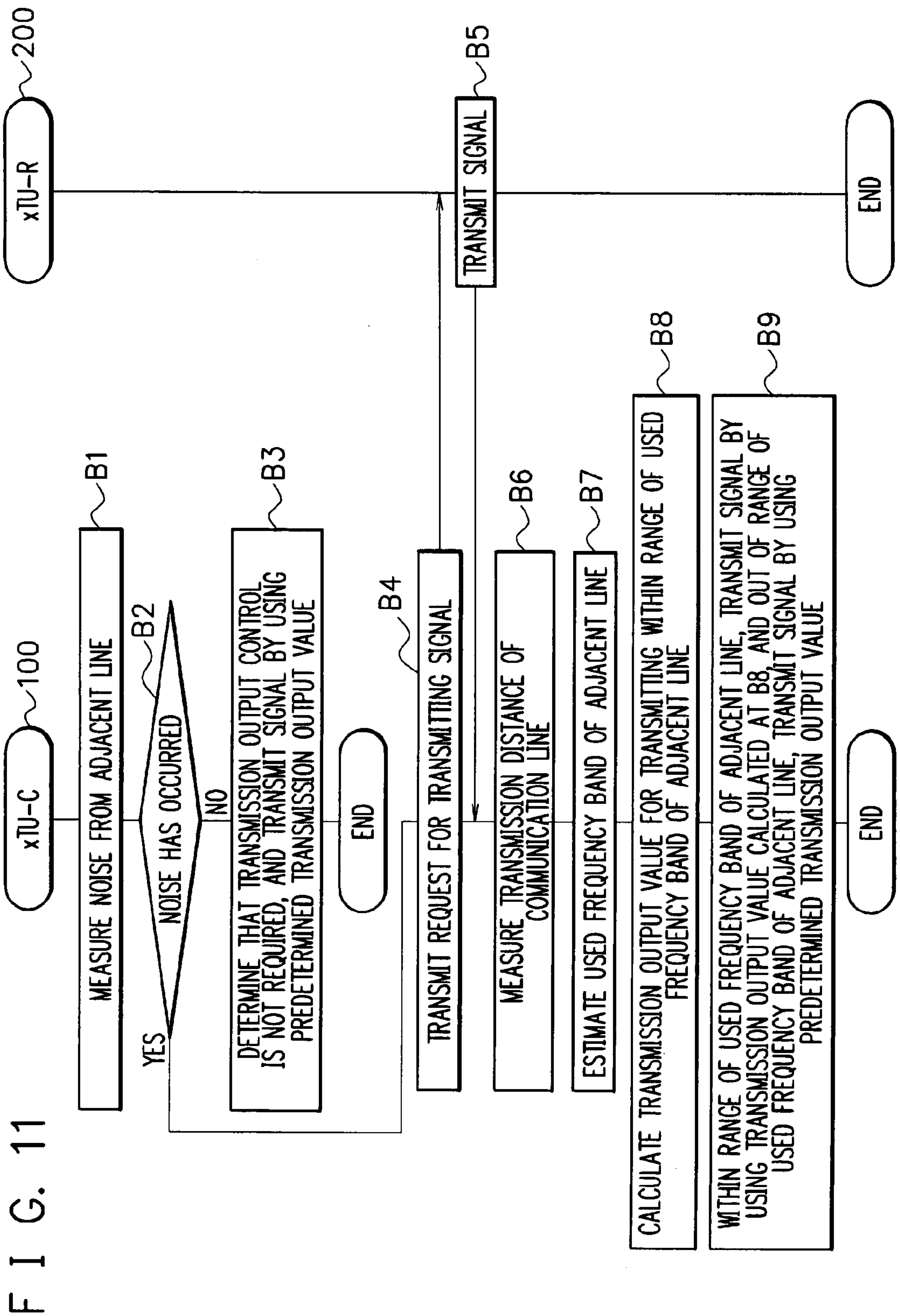
FIG. 11 is a sequence chart showing a series of processing operations in a multicarrier transmission system in a third example.

As shown in FIG. 11, a multicarrier transmission system in the third example is characterized in that the transmission distance of the communication line (300) is measured at the xTU-C (100) side (step B6), and the xTU-C (100) obtains the transmission distance of the communication line (300).

Thereby, since this example omits the measurement of the transmission distance of the communication line (300) at the xTU-R (200) side, a process at the xTU-R (200) side can be simplified.

Hereinafter, with reference to FIG. 11, a series of processing operations in the multicarrier transmission system in the third example will be described.

First, the xTU-C (100) measures the crosstalk noise from the xDSL on the adjacent line (400) by using the spectrum analyzer and the like (step B1).

Next, the xTU-C (100) determines whether or not the noise equal to or more than the predetermined threshold has occurred on the adjacent line (400), based on the crosstalk noise from the xDSL on the adjacent line (400) measured at step B1 (step B2).

If the xTU-C (100) determines that the noise equal to or more than the predetermined threshold has not occurred on the adjacent line (400) (step B2/No), the xTU-C (100) determines that the transmission output control is not required, and transmits the signal with the default predetermined transmission output value (step B3).

Moreover, if the xTU-C (100) determines that the noise equal to or more than the predetermined threshold has occurred on the adjacent line (400) (step B2/Yes), since the signal to be transmitted from the xTU-C (100) to the communication line (300) will affect the signal on the adjacent line (400), the xTU-C (100) performs the transmission output control with respect to the signal to be transmitted to the communication line (300).

Consequently, the xTU-C (100) transmits a request for transmitting the signal, via the communication line (300) to the xTU-R (200) side (step B4).

If the xTU-R (200) receives the request for transmitting the signal, the xTU-R (200) transmits the signal via the communication line (300) to the xTU-C (100) side (step B5).

The xTU-C (100) measures the transmission distance of the communication line (300), based on the receiving level of the signal received from the xTU-R (200) side via the communication line (300), and records the above described measured transmission distance of the communication line (300) (step B6).

Thereby, the xTU-C (100) can comprehend the transmission distance of the communication line (300).

Next, the xTU-C (100) estimates the used frequency band which is used by the xDSL on the adjacent line (400), based on the crosstalk noise from the xDSL on the adjacent line (400) measured at step B1 (step B7).

Moreover, the xTU-C (100) calculates the transmission output value of the signal to be transmitted from the xTU-C (100) to the communication line (300) within the range of the used frequency band estimated at step B7 (step B8).

Next, the xTU-C (100) performs the transmission output control based on the used frequency band of the xDSL on the adjacent line (400), which has been estimated at step B7, and the transmission output value calculated at step B8 (step B9).

In this case, within the range of the used frequency band of the xDSL on the adjacent line (400), the xTU-C (100) transmits the signal to the communication line (300) based on the transmission output value: PSD calculated by the above described Formula (2).

Moreover, out of the range of the used frequency band of the xDSL on the adjacent line (400), the xTU-C (100) transmits the signal to the communication line (300) based on the predetermined transmission output value: PSD(f).

In this way, the xTU-C (100) in this example calculates the transmission output value which has a less effect on the adjacent line (400), based on the difference between the transmission distance of the communication line (300) used by the xTU-C (100) and the transmission distance of the adjacent line (400) adjacent to the communication line (300), and controls to transmit the signal to the communication line (300) by using the above described calculated transmission output value.

Thereby, the xTU-C (100) can measure the transmission distance of the communication line (300) at the xTU-C (100) side, use the above described measured transmission distance of the communication line (300) and the transmission distance of the adjacent line (400) which has been previously obtained by the xTU-C (100) to suppress the transmission output value of the signal to be transmitted to the communication line (300), and control so that it may not affect the transmission speed of another xDSL which is using the adjacent line (400).

Consequently, the xTU-C (100) can suppress the crosstalk of the xDSL installed in the RT, and avoid the degradation of the transmission speed of the adjacent xDSL installed in the center.

It should be noted that an measuring time at which the xTU-C (100) measures the transmission distance of the communication line (300) is not limited to the time when the xTU-C (100) has determined that the noise equal to or more than the predetermined threshold has occurred on the adjacent line (400), as shown in FIG. 11 described above, and the system can be constructed so that the xTU-C (100) may measure the transmission distance of the communication line (300) at any time if the transmission distance of the communication line (300) has been measured when the transmission output value for transmitting within the range of the used frequency band of the adjacent line (400) is calculated at step B8.

It should be noted that the above described examples are preferred examples of the present invention and the scope of the present invention is not limited only to the above described examples. Those skilled in the art can modify or substitute the above described examples within a range without departing from the gist of the present invention to construct a form to which various alterations have been applied.

For example, in the multicarrier transmission system in the above described examples, if the xTU-C (100) measures the crosstalk noise from the xDSL on the adjacent line (400), the system can be constructed so that the xTU-C (100) may measure the noise of the far end crosstalk from the adjacent line (400) or measure the noise of the near end crosstalk from the adjacent line (400).

Moreover, in the multicarrier transmission system in the above described examples, the xTU-C (100) controls the transmission output value so that the effect on another adjacent line (400) may be reduced, based on the difference between the transmission distance of the communication line (300) and the transmission distance of the adjacent line (400). However, the system can also be constructed so that the xTU-R (200) controls the transmission output value so that the effect on another adjacent line (400) may be reduced, based on the difference between the transmission distance of the communication line (300) and the transmission distance of the adjacent line (400).

Moreover, in the multicarrier transmission system in the above described examples, it has been described that the far end crosstalk "FEXT" of the xDSL installed in the RT is suppressed and the degradation of the transmission speed of the adjacent xDSL installed in the center is avoided. However, the system can also be constructed to control not only the far end crosstalk "FEXT" of the xDSL installed in the RT, but also the near end crosstalk "NEXT" of the xDSL installed in the RT, for example, as shown in FIG. 12.

Moreover, control operations in the communication devices, that is, the xTU-C (100) and the xTU-R (200) configuring the multicarrier transmission system in the above described examples, can also be executed by hardware, software or a combined configuration of both.

It should be noted that, in the case of executing a process by software, the process can be executed by installing a program having a processing sequence recorded therein, into a memory within a computer embedded in dedicated hardware and causing the program to be executed, or by installing the program into a general purpose computer capable of executing various processes and causing the program to be executed.

For example, the program can be previously recorded in a hard disk or a ROM (Read Only Memory) as a recording medium.

Alternatively, the program can be temporarily or permanently stored (recorded) in removable recording media such as a floppy disk, a CD-ROM (Compact Disc Read Only Memory), an MO (Magneto optical) disc, a DVD (Digital Versatile Disc), a magnetic disk and a semiconductor memory.

These removable recording media can be provided as so-called package software.

It should be noted that, in addition to installation of the program from the above described removable recording media into the computer, the program can be wirelessly transferred from a download site to the computer or transferred wired to the computer through a network such as a LAN (Local Area Network) or the Internet, and the computer can receive the transferred program and install the program in the recording medium such as an integrated hard disk.

Moreover, the processing operations described in the above examples can be constructed to be not only executed in a time-series manner in accordance with the description, but also executed in parallel or individually, in accordance with processing capability of an apparatus which executes the processes, or if needed.

Moreover, the wireless communication system described in the above example can also be constructed to have a configuration of a logical set of multiple devices, or constructed so that functions of the respective devices are mixed.

According to the above description of the examples, this example has the following characteristics.

A transmission output control apparatus in this example is a transmission output control apparatus for controlling a transmission output of a signal to be outputted to a communication line, including:

a transmission output control unit for controlling the transmission output of the signal to be outputted to the above described communication line, based on a difference between a transmission distance of the above described communication line and a transmission distance of an adjacent line adjacent to the above described communication line.

Moreover, the transmission output control apparatus in this example is characterized in that the above described transmission output control unit controls the above described transmission output if a crosstalk noise from the above described adjacent line has exceeded a predetermined threshold.

Moreover, the transmission output control apparatus in this example is characterized by including a transmission output calculation unit for calculating a transmission output value depending on the above described difference, wherein the above described transmission output control unit controls the above described transmission output by using the transmission output value calculated by the above described transmission output calculation unit.

Moreover, the transmission output control apparatus in this example is characterized by including a used band estimation unit for estimating a used band of the above described adjacent line, wherein the above described transmission output control unit controls the above described transmission output within a range of the above described used band.

Moreover, the transmission output control apparatus in this example is characterized by including a used band estimation unit for estimating a used band of the above described adjacent line, wherein the above described transmission output control unit controls the above described transmission output by using the transmission output value calculated by the above described transmission output calculation unit, within a range of the above described used band, and the above described transmission output control unit controls the above described transmission output by using a predetermined transmission output value, out of the range of the above described used band.

Moreover, the transmission output control apparatus in this example is characterized by including an attenuation amount calculation unit for calculating an attenuation amount depending on the above described difference, wherein the above described transmission output calculation unit subtracts the above described attenuation amount from a predetermined transmission output value, and calculates the transmission output value depending on the above described difference.

Moreover, the transmission output control apparatus in this example is characterized by including a crosstalk noise measuring unit for measuring the crosstalk noise from the above described adjacent line, wherein the above described transmission output control unit controls the above described transmission output if the above described crosstalk noise measured by the above described crosstalk noise measuring unit has exceeded the predetermined threshold.

Moreover, the transmission output control apparatus in this example is characterized by including a crosstalk noise measuring unit for measuring a crosstalk noise from the above described adjacent line, wherein the above described used band estimation unit estimates the above described used band based on the above described crosstalk noise measured by the above described crosstalk noise measuring unit.

Moreover, the transmission output control apparatus in this example is characterized in that the above described used band estimation unit estimates a band in which the above described crosstalk noise has occurred, as the above described used band.

Moreover, the transmission output control apparatus in this example is characterized by including a determination unit for determining whether or not VDSL is using the above described adjacent line, wherein if it is determined that the VDSL is using the above described adjacent line, the above described transmission output control unit controls the above described transmission output.

Moreover, the transmission output control apparatus in this example is characterized by including a far end crosstalk measuring unit for measuring a noise of far end crosstalk from the above described adjacent line, wherein the above described determination unit determines whether or not the VDSL is using the above described adjacent line, based on the above described noise of the far end crosstalk.

Moreover, the transmission output control apparatus in this example is characterized in that the above described determination unit determines that the VDSL is using the above described adjacent line, if the above described noise of the far end crosstalk is equal to or more than a predetermined threshold.

Moreover, the transmission output control apparatus in this example is characterized by including a transmission distance obtaining unit for obtaining the transmission distance of the above described communication line.

Moreover, the transmission output control apparatus in this example is characterized in that the above described transmission distance obtaining unit has a transmission distance receiving unit for receiving the transmission distance of the above described communication line measured in a communication device connected via the above described communication line.

Moreover, the transmission output control apparatus in this example is characterized in that the above described transmission distance obtaining unit has a measurement request transmitting unit for transmitting a request for measuring the transmission distance of the above described communication line to the above described communication device, and the above described transmission distance receiving unit receives the transmission distance of the above described communication line measured in the above described communication device to which the above described request for measuring has been transmitted.

Moreover, the transmission output control apparatus in this example is characterized in that the above described transmission distance obtaining unit has a transmission distance measuring unit for measuring the transmission distance of the above described communication line.

Moreover, the transmission output control apparatus in this example is characterized in that the above described transmission distance measuring unit has a signal transmission requesting unit for transmitting a request for transmitting the signal, to a communication device connected via the above described communication line; and a signal receiving unit for receiving the signal transmitted from the above described communication device to the above described communication line, and the above described transmission distance measuring unit measures the transmission distance of the above described communication line based on the signal received by the above described signal receiving unit.

Moreover, the transmission output control apparatus in this example is characterized in that the transmission distance of the above described adjacent line is longer than the transmission distance of the above described communication line.

Moreover, a multicarrier transmission system in this example is a multicarrier transmission system configured so that a first communication device and a second communication device are connected via a communication line, wherein the above described first communication device has a transmission output control unit for controlling a transmission output of a signal to be outputted to the above described communication line, based on a difference between a transmission distance of the above described communication line and a transmission distance of an adjacent line adjacent to the above described communication line.

Moreover, the multicarrier transmission system in this example is characterized in that the above described transmission output control unit controls the above described transmission output if a crosstalk noise from the above described adjacent line has exceeded a predetermined threshold.

Moreover, the multicarrier transmission system in this example is characterized in that the above described first communication device has a transmission output calculation unit for calculating a transmission output value depending on the above described difference, and the above described transmission output control unit controls the above described transmission output by using the transmission output value calculated by the above described transmission output calculation unit.

Moreover, the multicarrier transmission system in this example is characterized in that the above described first communication device has a used band estimation unit for estimating a used band of the above described adjacent line, and the above described transmission output control unit controls the above described transmission output within a range of the above described used band.

Moreover, the multicarrier transmission system in this example is characterized in that the above described first communication device has a used band estimation unit for estimating a used band of the above described adjacent line;

the above described transmission output control unit controls the above described transmission output by using the transmission output value calculated by the above described transmission output calculation unit, within a range of the above described used band; and the above described transmission output control unit controls the above described transmission output by using a predetermined transmission output value, out of the range of the above described used band.

Moreover, the multicarrier transmission system in this example is characterized in that the above described first communication device has an attenuation amount calculation unit for calculating an attenuation amount depending on the above described difference, and the above described transmission output calculation unit subtracts the above described attenuation amount from a predetermined transmission output value, and calculates the transmission output value depending on the above described difference.

Moreover, the multicarrier transmission system in this example is characterized in that the above described first communication device has a crosstalk noise measuring unit for measuring the crosstalk noise from the above described adjacent line, and the above described transmission output control unit controls the above described transmission output if the above described crosstalk noise measured by the above described crosstalk noise measuring unit has exceeded the predetermined threshold.

Moreover, the multicarrier transmission system in this example is characterized in that the above described first communication device has a crosstalk noise measuring unit for measuring a crosstalk noise from the above described adjacent line, and the above described used band estimation unit estimates the above described used band based on the crosstalk noise measured by the above described crosstalk noise measuring unit.

Moreover, the multicarrier transmission system in this example is characterized in that the above described used band estimation unit estimates a band in which the above described crosstalk noise has occurred, as the above described used band.

Moreover, the multicarrier transmission system in this example is characterized in that the above described first communication device has a determination unit for determining whether or not VDSL is using the above described adjacent line, and if it is determined that the VDSL is using the above described adjacent line, the above described transmission output control unit controls the above described transmission output.

Moreover, the multicarrier transmission system in this example is characterized in that the above described first communication device has a far end crosstalk measuring unit for measuring a noise of far end crosstalk from the above described adjacent line, and the above described determination unit determines whether or not the VDSL is using the above described adjacent line, based on the above described noise of the far end crosstalk.

Moreover, the multicarrier transmission system in this example is characterized in that the above described determination unit determines that the VDSL is using the above described adjacent line, if the above described noise of the far end crosstalk is equal to or more than a predetermined threshold.

Moreover, the multicarrier transmission system in this example is characterized in that the above described second communication device has a transmission distance measuring unit for measuring the transmission distance of the above described communication line; and a transmitting unit for transmitting the transmission distance of the above described communication line measured by the above described transmission distance measuring unit to the above described first communication device, and the above described first communication device has a receiving unit for receiving the transmission distance of the above described communication line measured in the above described second communication device.

Moreover, the multicarrier transmission system in this example is characterized in that the above described first communication device has a measurement request transmitting unit for transmitting a request for measuring the transmission distance of the above described communication line to the above described second communication device, and if the above described request for measuring has been received, the above described transmission distance measuring unit measures the transmission distance of the above described communication line.

Moreover, the multicarrier transmission system in this example is characterized in that the above described first communication device has a signal transmission requesting unit for transmitting a request for transmitting the signal, to the above described second communication device;

a signal receiving unit for receiving the signal transmitted from the above described second communication device to the above described communication line; and a transmission distance measuring unit for measuring the transmission distance of the above described communication line based on the signal received by the above described signal receiving unit, and the above described second communication device has a signal transmitting unit for transmitting the signal to the above described communication line if the above described second communication device has received the above described request for transmitting the signal.

Moreover, the multicarrier transmission system in this example is characterized in that the transmission distance of the above described adjacent line is longer than the transmission distance of the above described communication line.

Moreover, a transmission output control method in this example is a transmission output control method performed in a transmission output control apparatus for controlling a transmission output of a signal to be outputted to a communication line, wherein the above described transmission output control apparatus performs a transmission output control step for controlling the transmission output of the signal to be outputted to the above described communication line, based on a difference between a transmission distance of the above described communication line and a transmission distance of an adjacent line adjacent to the above described communication line.

Moreover, a transmission output control method in this example is a transmission output control method performed in a multicarrier transmission system configured so that a first communication device and a second communication device are connected via a communication line, wherein the above described first communication device performs a transmission output control step for controlling a transmission output of a signal to be outputted to the above described communication line, based on a difference between a transmission distance of the above described communication line and a transmission distance of an adjacent line adjacent to the above described communication line.

Moreover, a transmission output control program in this example is a transmission output control program executed by a transmission output control apparatus for controlling a transmission output of a signal to be outputted to a communication line, wherein a transmission output control process for controlling the transmission output of the signal to be outputted to the above described communication line, based on a difference between a transmission distance of the above described communication line and a transmission distance of an adjacent line adjacent to the above described communication line, is executed by the above described transmission output control apparatus.

It should be noted that the transmission output control apparatus, the multicarrier transmission system, the transmission output control method and the transmission output control program in this example as described above can be applied to the xDSL (x Digital Subscriber Line) (x is a collective designation of A, H, S, V and the like) which performs a data transmission at a high speed of several Mbits/seconds via a metallic cable such as a telephone line.

Moreover, the transmission output control apparatus, the multicarrier transmission system, the transmission output control method and the transmission output control program in this example as described above are effective for handling the crosstalk noise in the case where both of the xDSL installed in the center and the xDSL installed in the RT are the VDSLs.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A transmission output control apparatus for controlling a transmission output of a signal to be outputted to a communication line, comprising:

a transmission output control unit that controls the transmission output of the signal to be outputted to said communication line, based on a difference between a transmission distance of said communication line and a transmission distance of an adjacent line adjacent to said communication line;

a transmission output calculation unit that calculates a transmission output value depending on said difference; and a used band estimation unit that estimates a used band of said adjacent line, wherein said transmission output control unit controls said transmission output by using the transmission output value calculated by said transmission output calculation unit within a range of said used band, and said transmission output control unit controls said transmission output by using a predetermined transmission output value out of the range of said used band, and said transmission output control unit controls said transmission output if a crosstalk noise from said adjacent line has exceeded a predetermined threshold.

2. The transmission output control apparatus according to claim 1, further comprising an attenuation amount calculation unit that calculates an attenuation amount depending on said difference, wherein said transmission output calculation unit subtracts said attenuation amount from a predetermined transmission output value, and calculates the transmission output value depending on said difference.

3. The transmission output control apparatus according to claim 1, further comprising a crosstalk noise measuring unit that measures the crosstalk noise from said adjacent line, wherein said transmission output control unit controls said transmission output if said crosstalk noise measured by said crosstalk noise measuring unit has exceeded the predetermined threshold.

4. The transmission output control apparatus according to claim 1, further comprising a crosstalk noise measuring unit that measures a crosstalk noise from said adjacent line, wherein said used band estimation unit estimates said used band based on said crosstalk noise measured by said crosstalk noise measuring unit.

5. The transmission output control apparatus according to claim 4, wherein said used band estimation unit estimates a band in which said crosstalk noise has occurred, as said used band.

6. The transmission output control apparatus according to claim 1, further comprising a determination unit that determines whether VDSL is using said adjacent line, wherein if it is determined that the VDSL is using said adjacent line, said transmission output control unit controls said transmission output.

7. The transmission output control apparatus according to claim 6, further comprising a far end crosstalk measuring unit that measures a noise of far end crosstalk from said adjacent line, wherein said determination unit determines whether the VDSL is using said adjacent line, based on said noise of the far end crosstalk.

8. The transmission output control apparatus according to claim 7, wherein said determination unit determines that the VDSL is using said adjacent line, if said noise of the far end crosstalk is equal to or more than a predetermined threshold.

9. The transmission output control apparatus according to claim 1, further comprising a transmission distance obtaining unit that obtains the transmission distance of said communication line.

10. The transmission output control apparatus according to claim 9, wherein said transmission distance obtaining unit includes a transmission distance receiving unit that receives the transmission distance of said communication line measured in a communication device connected via said communication line.

11. The transmission output control apparatus according to claim 10, wherein said transmission distance obtaining unit includes a measurement request transmitting unit that transmits a request for measuring the transmission distance of said communication line to said communication device, and said transmission distance receiving unit receives the transmission distance of said communication line measured in said communication device to which said request for measuring has been transmitted.

12. The transmission output control apparatus according to claim 9, wherein said transmission distance obtaining unit includes a transmission distance measuring unit that measures the transmission distance of said communication line.

13. The transmission output control apparatus according to claim 12, wherein said transmission distance measuring unit includes a signal transmission requesting unit that transmits a request for transmitting the signal, to a communication device connected via said communication line; and a signal receiving unit that receives the signal transmitted from said communication device to said communication line, wherein said transmission distance measuring unit measures the transmission distance of said communication line based on the signal received by said signal receiving unit.

14. The transmission output control apparatus according to claim 1, wherein the transmission distance of said adjacent line is longer than the transmission distance of said communication line.

15. A transmission output control apparatus for controlling a transmission output of a signal to be outputted to a communication line, comprising:

transmission output control means for controlling the transmission output of the signal to be outputted to said communication line, based on a difference between a transmission distance of said communication line and a transmission distance of an adjacent line adjacent to said communication line;

transmission output calculating means for calculating a transmission output value depending on said difference; and used band estimating means for estimating a used band of said adjacent line, wherein said transmission output control means controls said transmission output by using the transmission output value calculated by said transmission output calculating means within a range of said used band, and said transmission output control means controls said transmission output by using a predetermined transmission output value out of the range of said used band, and said transmission output control means controls said transmission output if a crosstalk noise from said adjacent line has exceeded a predetermined threshold.

16. A multicarrier transmission system, comprising:

a first communication device and a second communication device which are connected via a communication line, said first communication device including:

a transmission output control unit that controls a transmission output of a signal to be outputted to said communication line, based on a difference between a transmission distance of said communication line and a transmission distance of an adjacent line adjacent to said communication line;

a transmission output calculation unit that calculates a transmission output value depending on said difference; and a used band estimation unit that estimates a used band of said adjacent line, wherein said transmission output control unit controls said transmission output by using the transmission output value calculated by said transmission output calculation unit within a range of said used band, and said transmission output control unit controls said transmission output by using a predetermined transmission output value out of the range of said used band, and said transmission output control unit controls said transmission output if a crosstalk noise from said adjacent line has exceeded a predetermined threshold.

17. The multicarrier transmission system according to claim 16, wherein said first communication device includes an attenuation amount calculation unit that calculates an attenuation amount depending on said difference, and said transmission output calculation unit subtracts said attenuation amount from a predetermined transmission output value, and calculates the transmission output value depending on said difference.

18. The multicarrier transmission system according to claim 16, wherein said first communication device includes a crosstalk noise measuring unit that measures the crosstalk noise from said adjacent line, and said transmission output control unit controls said transmission output if said crosstalk noise measured by said crosstalk noise measuring unit has exceeded the predetermined threshold.

19. The multicarrier transmission system according to claim 16, wherein said first communication device includes a crosstalk noise measuring unit that measures a crosstalk noise from said adjacent line, and said used band estimation unit estimates said used band based on the crosstalk noise measured by said crosstalk noise measuring unit.

20. The multicarrier transmission system according to claim 19, wherein said used band estimation unit estimates a band in which said crosstalk noise has occurred, as said used band.

21. The multicarrier transmission system according to claim 16, wherein said first communication device includes a determination unit that determines whether VDSL is using said adjacent line, and if it is determined that the VDSL is using said adjacent line, said transmission output control unit controls said transmission output.

22. The multicarrier transmission system according to claim 21, wherein said first communication device includes a far end crosstalk measuring unit that measures a noise of far end crosstalk from said adjacent line, and said determination unit determines whether the VDSL is using said adjacent line, based on said noise of the far end crosstalk.

23. The multicarrier transmission system according to claim 16, wherein said determination unit determines that the VDSL is using said adjacent line, if said noise of the far end crosstalk is equal to or more than a predetermined threshold.

24. The multicarrier transmission system according to claim 16, wherein said second communication device includes:

a transmission distance measuring unit that measures the transmission distance of said communication line; and a transmitting unit that transmits the transmission distance of said communication line measured by said transmission distance measuring unit to said first communication device, wherein said first communication device includes a receiving unit that receives the transmission distance of said communication line measured in said second communication device.

25. The multicarrier transmission system according to claim 24, wherein said first communication device includes a measurement request transmitting unit that transmits a request for measuring the transmission distance of said communication line to said second communication device, and if said request for measuring has been received, said transmission distance measuring unit measures the transmission distance of said communication line.

26. The multicarrier transmission system according to claim 16, wherein said first communication device includes:

a signal transmission requesting unit that transmits a request for transmitting the signal, to said second communication device;

a signal receiving unit that receives the signal transmitted from said second communication device to said communication line; and a transmission distance measuring unit that measures the transmission distance of said communication line based on the signal received by said signal receiving unit, wherein said second communication device includes a signal transmitting unit that transmits the signal to said communication line if said second communication device has received said request for transmitting the signal.

27. The multicarrier transmission system according to claim 16, wherein the transmission distance of said adjacent line is longer than the transmission distance of said communication line.

28. A multicarrier transmission system, comprising:

a first communication device and a second communication device which are connected via a communication line, said first communication device comprising:

transmission output control means for controlling a transmission output of a signal to be outputted to said communication line, based on a difference between a transmission distance of said communication line and a transmission distance of an adjacent line adjacent to said communication line;

transmission output calculating means for calculating a transmission output value depending on said difference; and used band estimating means for estimating a used band of said adjacent line, wherein said transmission output control means controls said transmission output by using the transmission output value calculated by said transmission output calculating means within a range of said used band, and said transmission output control means controls said transmission output by using a predetermined transmission output value out of the range of said used band, and said transmission output control means controls said transmission output if a crosstalk noise from said adjacent line has exceeded a predetermined threshold.

29. A transmission output control method performed in a transmission output control apparatus for controlling a transmission output of a signal to be outputted to a communication line, said method comprising:

controlling, in said transmission output control apparatus, the transmission output of the signal to be outputted to said communication line, based on a difference between a transmission distance of said communication line and a transmission distance of an adjacent line adjacent to said communication line;

calculating a transmission output value depending on said difference; and estimating a used band of said adjacent line, wherein said controlling said transmission output comprises controlling said transmission output by using the transmission output value within a range of said used band, and controlling said transmission output by using a predetermined transmission output value out of the range of said used band, and controlling said transmission output if a crosstalk noise from said adjacent line has exceeded a predetermined threshold.

30. A transmission output control method for a multicarrier transmission system where a first communication device and a second communication device are connected via a communication line, the method comprising:

controlling, in said first communication device, a transmission output of a signal to be outputted to said communication line, based on a difference between a transmission distance of said communication line and a transmission distance of an adjacent line adjacent to said communication line;

calculating a transmission output value depending on said difference; and estimating a used band of said adjacent line, wherein said controlling said transmission output comprises controlling said transmission output by using the transmission output value within a range of said used band, and controlling said transmission output by using a predetermined transmission output value out of the range of said used band, and controlling said transmission output if a crosstalk noise from said adjacent line has exceeded a predetermined threshold.

31. A non-transitory computer-readable storage medium having embodied thereon a transmission output control program, which when executed by a computer, causes the computer to control a transmission output of a signal to be outputted to a communication line, and to perform:

controlling the transmission output of the signal to be outputted to said communication line, based on a difference between a transmission distance of said communication line and a transmission distance of an adjacent line adjacent to said communication line;

calculating a transmission output value depending on said difference; and estimating a used band of said adjacent line, wherein said controlling said transmission output comprises controlling said transmission output by using the transmission output value within a range of said used band, and controlling said transmission output by using a predetermined transmission output value out of the range of said used band, and controlling said transmission output if a crosstalk noise from said adjacent line has exceeded a predetermined threshold.

* * * * *